Oct. 21, 1941.    R. W. HALL ET AL    2,260,024
INSULATED ELECTRICAL CONDUCTOR
Filed Sept. 1, 1938

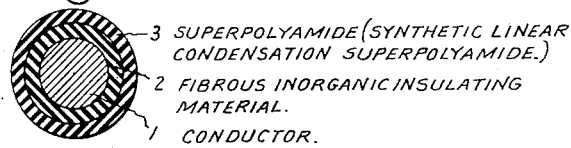

Fig.1.
3 — SUPERPOLYAMIDE (SYNTHETIC LINEAR CONDENSATION SUPERPOLYAMIDE.)
2 — FIBROUS INORGANIC INSULATING MATERIAL.
1 — CONDUCTOR.

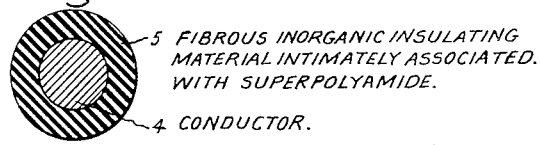

Fig.2.
5 — FIBROUS INORGANIC INSULATING MATERIAL INTIMATELY ASSOCIATED WITH SUPERPOLYAMIDE.
4 — CONDUCTOR.

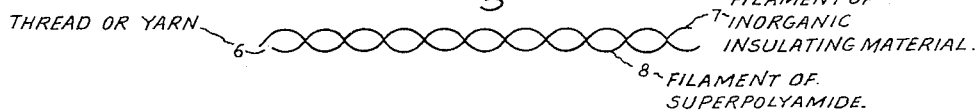

Fig.3.
THREAD OR YARN — 6
7 — FILAMENT OF INORGANIC INSULATING MATERIAL.
8 — FILAMENT OF SUPERPOLYAMIDE.

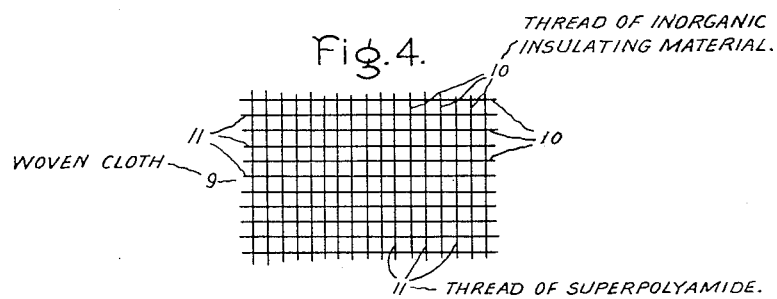

Fig.4.
10 — THREAD OF INORGANIC INSULATING MATERIAL.
WOVEN CLOTH — 9
11 — THREAD OF SUPERPOLYAMIDE.

Fig.5.
FILAMENT OF INORGANIC INSULATING MATERIAL — 14
13 — FILAMENT OF SUPERPOLYAMIDE.
STAPLE YARN — 12

Inventors:
Ralph W. Hall,
Henry A. Smith,
by Harry E. Dunham
Their Attorney.

Patented Oct. 21, 1941

2,260,024

UNITED STATES PATENT OFFICE 2,260,024

INSULATED ELECTRICAL CONDUCTOR

Ralph W. Hall and Henry A. Smith, Fort Wayne, Ind., assignors to General Electric Company, a corporation of New York Application September 1, 1938, Serial No. 227,894

8 Claims. (Cl. 174—121)

This invention relates to insulated electrical conductors. It is concerned more particularly with electrical conductors provided with insulation comprising fibrous inorganic material suitably combined with a particular synthetic organic material hereafter identified.

Various fibrous inorganic materials previously have been used or suggested for use in insulating conductors. Among such materials may be mentioned asbestos, spun glass (also known as fibre glass), mineral wool and the like. These materials alone are relatively poor electrical insulators and are deficient in mechanical strength. Hence it has been common practice to combine them, as by impregnation, with other materials in order to provide a composite insulation that effectively will meet the service requirements of the insulated conductor.

We have discovered that an insulated conductor of improved characteristics, being particularly resistant to heat and having a high dielectric and mechanical strength, is obtained by suitably combining a fibrous inorganic insulating material with a synthetic linear condensation superpolyamide. Such superpolyamides are described, for example, in British Patents 461,236 and 461,237.

As stated in British Patent 461,236, superpolyamides can be obtained by suitable heat treatment of one or more monoaminomonocarboxylic acids having amino and carboxylic acid radicals attached to the carbon atoms that are most remote from each other and contain no substituent groups other than hydrocarbon radicals. Superpolyamides also can be prepared by suitably heating esters of such monoaminomonocarboxylic acids, or low molecular weight polyamides obtainable from said acids or their esters, or mixtures of the foregoing substances. As pointed out in British Patent 461,237 superpolyamides also are derived from the reaction of diamines of the formula $NH_2CH_2RCH_2NH_2$ and dicarboxylic acids (and their amide-forming derivatives) of the formula $HOOCCH_2R'CH_2COOH$ in which R and R' are divalent hydrocarbon radicals and in which R has a chain length of at least two carbon atoms. Within this class the most desirable superpolyamides in carrying the present invention into effect are prepared from diamines of the formula $NH_2(CH_2)_xNH_2$ and dicarboxylic acids of the formula $$HOOC(CH_2)_yCOOH$$

in which $x$ is at least 4 and $y$ at least 3. A preferred superpolyamide is a reaction product of hexamethylene diamine and adipic acid. Superpolyamides produced in accordance with either of the above British patents are capable of being drawn or spun into continuous filaments. These filaments may be made into the form of threads or yarns of varying thicknesses, or into felted or woven sheets, tapes or the like. These superpolyamides also may be converted into smooth-surfaced continuous sheets, tapes, etc.

The term "superpolyamide" as used generally herein is intended to include within its meaning the products described briefly above and more fully, in for example, the aforesaid British patents.

The novel features of our invention are set forth in the appended claims. The invention itself, however, will be understood most readily from the following description when considered in connection with the accompanying drawing in which Fig. 1 is a cross-sectional view of an electrical conductor insulated in accordance with one embodiment of the invention;

Fig. 2 is a similar view of a conductor insulated in accordance with another embodiment of the invention; and Figs. 3, 4 and 5 are enlarged views showing somewhat diagrammatically various modifications of insulating materials produced in accordance with the invention and which are especially adapted for use in preparing the insulated conductors shown in Figs. 1 and 2.

With further reference to the drawing there is shown by way of illustration in Fig. 1 a conductor having superposed directly thereon a layer 2 of fibrous inorganic material which may be, for example, asbestos, spun glass, mineral wool, or the like. This inorganic material may be applied in various ways. For instance, it may be in thread, yarn or tape form and may be wrapped upon the wire. Or, it may be applied to the wire in felted or mat form, using apparatus similar to that employed in applying felted asbestos to wire. Over the layer 2 is applied a layer 3 of a composition comprising a superpolyamide. This material may be, for instance, in the form of a thread, yarn, woven fabric or smooth-surfaced continuous sheet, and may be applied in ways such as above mentioned with reference to the fibrous inorganic material.

The insulated conductor shown in Fig. 2 represents a preferred embodiment of the invention. As there shown, the bare conductor 4 is insulated with a layer 5 comprising fibrous inorganic material intimately associated with a superpolyamide. This intimate association may be effected, if desired, by dissolving the superpolyamide in a suitable solvent and applying the resulting solution to the inorganic fibre covered conductor. The superpolyamide solution may be applied, for example, by passing the said conductor through a bath of the same, or by spraying the solution upon the fibrous covering. In the former case, the usual wire-enameling apparatus may be employed, together with a suitable wiper for removing excess material. The concentration of the solution, the rate of travel of the wire therethrough and the number of times the wire is passed through the solution are varied as may be necessary in order to impregnate the inorganic fibrous material with superpolyamide to the desired degree.

In the case of conductors of small diameter such, for instance, as copper wires used in winding coils, the fibrous inorganic covering, especially when it is spun glass, preferably is coated and partly, but not completely, impregnated with superpolyamide. In this way a more flexible composite insulating covering is obtained. For larger conductors, which are less sharply or less frequently bent and where, therefore, a highly flexible insulation is of lesser importance, the inorganic fibrous covering advantageously may be coated and completely impregnated with superpolyamide.

The superpolyamide-treated, inorganic fibrous covered wire is baked at an elevated temperature, for example, by continuously passing the wire through an electrically heated oven maintained at such temperature that the solvent evaporates and the superpolyamide becomes hard, flexible, tough and abrasion-resistant. Heating the covered wire, for instance, at a temperature as high as about 350° C. for a period of the order of about one-half minute after each application of the superpolyamide solution ordinarily is sufficient to produce the desired results. From a practical standpoint, heating the superpolyamide-coated and -impregnated wire at a temperature above the boiling point of the solvent used is desirable. In all cases, the higher the temperature used, the shorter the period of heating; and, conversely, the lower the temperature, the longer the heating time.

Alternatively, an intimate association of the fibrous inorganic material and the superpolyamide may be effected in such ways as the following:

A thread or yarn 6 (Fig. 3) is made by twisting together one or more filaments 7 of inorganic insulating material, for example, glass, asbestos, etc., with one or more filaments 8 of superpolyamide. If desired, the resulting thread or yarn may be woven into the form of a cloth.

A woven cloth 9 (Fig. 4) is made by weaving together threads of inorganic insulating material such as glass and the like with threads of superpolyamide. Such a cloth may have, for example, all the threads lying in one direction, for instance the warp threads, formed of superpolyamide; and all the threads lying in the other direction, for example the woof threads, formed of inorganic material. Or, as shown in Fig. 4, the warp and woof threads may comprise threads 10 of inorganic insulating material (capable of being drawn or spun into a filament or thread) alternated with threads 11 of superpolyamide.

A staple yarn 12 (Fig. 5) also may be made by incorporating staple superpolyamide with staple asbestos, spun glass or the like. The mixed staple fibres are spun into a yarn in a manner similar to that used in producing cotton yarn. In the drawing the numeral 13 designates filaments of superpolyamide and the numeral 14, filaments of inorganic insulating material.

The threads, yarns or cloths made as above described are applied to the conductor as insulation therefor by any suitable wrapping or covering means.

In accordance with a preferred embodiment of the invention, these threads, yarns or cloths, after being applied to the conductor, are heated in place to melt or fuse the superpolyamide. In this way the filaments or threads of inorganic material are bonded together and the whole is adhesively held in place upon the conductor. In some cases it may be desirable to wind wire insulated with the combination of inorganic fibrous material and superpolyamide into apparatus, fusing the organic portion in place afterwards.

When a layer of superpolyamide is superposed upon a layer of fibrous inorganic material, we prefer in most cases to heat the superpolyamide at or above its fusion point, as described more fully in the co-pending application of Henry A. Smith, Serial No. 227,980, filed concurrently herewith and assigned to the same assignee as the present invention. In this way the interstices of the fibrous inorganic material are filled with superpolyamide, and the electrical and mechanical properties of the insulation are improved.

In cases where the fibrous inorganic material is wholly or partly impregnated with superpolyamide by the solution or fusion methods above described, it sometimes may be desirable to polish the thus insulated conductor by passing it through a high speed rotating polisher such, for instance, as the kind employed in smoothing a cotton covering upon a wire. In this way surface irregularities are removed. If desired, the covered conductor may be heated further during or after the polishing operation.

The insulated conductor made as above set forth may be further treated, as desired or as conditions may require. For instance, a coating of wax may be applied over the described insulation and the wire again polished to cause it to run more easily on winding machines.

For certain purposes it may be desirable to apply one or more coatings of conventional insulation over the new composite insulation. Depending upon the particular conditions of service use, the conventional insulation may be an ordinary organic enamel such, for example, as an oleoresinous varnish. Or, it may be some other insulating material as, for instance, natural or synthetic rubber; cotton; paper; varnished cambric; natural or artificial silk (rayon); regenerated cellulose; cellulose derivatives such as cellulose esters, for instance, cellulose acetate, cellulose triacetate, cellulose propionate, cellulose butyrate, etc., or cellulose ethers such as ethyl cellulose, benzyl cellulose, etc.; or various resins such, for example, as alkyd resins, particularly flexible alkyd resins, plasticized polyvinyl chloride, polyacrylates such as the polymerized alkyl esters of acrylic acid, rubber hydrochloride, polyvinyl acetals, shellac, etc. If desired, the new insulating material may be sandwiched between layers or coatings of conventional insulating substances.

The adherence of the fibrous insulating material to the wire may be improved, in certain cases, by the following procedure: First, coat the wire with an ordinary organic enamel which will soften in the presence of heat or solvents or both. Thus, we may coat the bare wire advantageously with, for instance, an enamel of the oleo-resinous type, apply a fibrous inorganic insulating material over the dried or partly dried enamel, and finally coat and at least partly impregnate the fibrous layer with a solution of a superpolyamide. Enough solvent from the superpolyamide solution penetrates the fibrous layer to cause a slight softening of the enamel. As a result, the enamel adhesively holds the fibrous material in place upon the wire.

Still another method of insulating conductors in accordance with the present invention is to apply the combination of fibrous inorganic material and superpolyamide as a unit. For example, we may prepare a suitable solution of a superpolyamide and apply such solution by means of spray apparatus to felted fibrous inorganic insulating material carried on a conveyor belt or apron. When the sheet fibrous material initially has adequate strength, for instance when in the form of a woven cloth, it may be coated and impregnated somewhat more conveniently by passing it through a bath formed of a suitable solution of superpolyamide. The sprayed or the immersed material is dried. Such spraying or immersing operations may be repeated, as desired or as may be necessary, in order to obtain a material of the desired thickness. When the felted fibrous inorganic material has sufficient spray-deposited coating of superpolyamide thereon to give it adequate strength, it may be passed through a bath of superpolyamide and further coated in this way.

Another method of making the unitary insulation is to employ the superpolyamide in plastic state, using heat, pressure or solvents, or any combinations thereof, as desired or as may be required to cause the superpolyamide to assume a plastic state. The plastic material is applied to sheet fibrous inorganic material, in felted or woven state, under pressure, preferably under heat and pressure. A small amount of a solution of superpolyamide may be used, if necessary, as an adhesive to aid in the combination of the materials. Other suitable adhesives also may be used. The combined material is oven baked to expel solvents, if any are present in the mass, and to convert the superpolyamide to a hard, flexible, tough and abrasion resistant state.

Unitary insulating structures comprising one or more sheets of asbestos, spun glass, mineral wool, etc., faced on either or both sides with superpolyamide, may be made as above described. To either or both sides of such insulation may be bonded by any suitable means, any conventional insulating material such, for instance, as those mentioned hereinbefore.

Flexible unitary insulating structures or laminated materials produced in the manner above set forth may be applied to a conducting surface such as a metallic core of stranded or solid wire in any known manner, as for example, by the strip-covering method.

While we have described our invention with reference to superpolyamides generally, a preferred superpolyamide is one obtained by reacting hexamethylene diamine and adipic acid, for instance as described under Example 2 of British Patent 461,237. This particular superpolyamide has a melting point of the order of 248° C. and hence is especially adapted for use in preparing the heat-resisting composite insulation herein described.

Instead of using a superpolyamide alone, we may use for certain applications as, for example, in impregnating or laminating work, superpolyamide which has been modified, for example by incorporating therewith, prior to use, a suitable proportion, for instance, up to 50 per cent by weight, preferably from about 5 to 40 per cent, of a compatible potentially reactive (heat-hardenable) synthetic resin. We prefer to use a phenol-aldehyde resin, more specifically a phenol-formaldehyde resin prepared and incorporated with a superpolyamide as described in the copending application of Henry A. Smith and Edward H. Jackson, Serial No. 227,981, filed concurrently herewith and assigned to the same assignee as the present invention. A more specific example of such a heat-hardenable resin described in the Smith et al. application is one obtained by reacting cresol with formaldehyde in the ratio of 1 mole cresol to at least 0.7 mole formaldehyde and in the presence of an alkaline catalyst, e. g., morpholine, ethanolamines, etc. The heat-hardenable resin is hardened in the presence of the superpolyamide under heat, for example during baking of a wire covered with fibrous inorganic material coated and impregnated with a superpolyamide modified with a heat-hardenable resin.

The insulation of the insulated conductors of this invention is mechanically strong, hard, tough, flexible, and remarkably heat- and abrasion-resistant. It is resistant to attack by such agencies as oil, varnish, conventional refrigerants such as, for example, dichlordifluormethane and sulfur dioxide, as well as other halogenated compounds, for example mixtures of chlorinated diphenyl compounds (known under the trade name of "Pyranol"), and other agencies with which the insulated conductors come into contact during manufacture of electrical equipment or in service use. The insulation of this invention also has a high dielectric strength, in general being of the order of 1000 to 1400 volts per mil, and is capable of withstanding relatively high temperatures for prolonged periods without material deterioration.

In our application Serial No. 391,186, filed April 30, 1941, which is a division of the present application, we have claimed sheet materials comprising associated threads or yarns formed of at least two different fibrous materials, one of which is a fibrous, inorganic, non-metallic material, specifically glass fibres, and the other of which is a fibrous composition comprising a superpolyamide. We have also claimed in the said divisional application threads or yarns comprising a combination of fibrous, inorganic, non-metallic material and a composition comprising a superpolyamide.

What we claim as new and desire to secure by Letters Patent of the United States is:

1. An insulated electrical conductor in which the insulation comprises fibre glass associated with a composition comprising a superpolyamide modified with a synthetic resin.

2. An electrical conductor insulated with a layer of fibre glass, said layer being coated and partly but not completely impregnated with a composition comprising a superpolyamide.

3. An insulated conductor in which the insulation comprises a mass of glass fibres intimately associated with a composition comprising a superpolyamide obtained by reacting hexamethylene diamine with adipic acid, said superpolyamide being modified with a phenol-aldehyde resin.

4. An electrical cable comprising a metallic conductor having superimposed directly thereon as insulation therefor a mass of glass fibres, said mass being coated and at least partly impregnated with a heat-treated composition comprising a superpolyamide having incorporated therewith from about 5 to 50 per cent by weight of the whole of a compatible heat-hardenable synthetic resin, said insulation being mechanically strong, hard, tough, flexible, heat- and abrasion-resistant and having a high dielectric strength.

5. An insulated conductor comprising a conducting core and insulation for said core comprising a layer of glass fibres and over said layer a covering of a composition comprising a superpolyamide.

6. An electrical cable comprising a metallic conductor having superimposed directly thereon a wrapping of glass fibres and a wrapping of a superpolyamide in fibre form enveloping the whole.

7. Copper wire insulated with a layer of glass fibres superimposed directly on the bare wire and over said layer, and in contact therewith, a layer of a superpolyamide in fibre form.

8. An electrical cable as in claim 4 wherein the heat-hardenable synthetic resin is the resinous reaction product of cresol with formaldehyde in the ratio of 1 mole cresol to at least 0.7 mole formaldehyde and in the presence of an alkaline catalyst.

RALPH W. HALL.
HENRY A. SMITH.